United States Patent
Pschierer et al.

(10) Patent No.: US 12,320,668 B2
(45) Date of Patent: Jun. 3, 2025

(54) AIRPORT MAP VALIDATION SYSTEMS AND METHODS

(71) Applicant: THE BOEING COMPANY, Chicago, IL (US)

(72) Inventors: Christian Karl Pschierer, Ochsenfurt (DE); Andreas Sindlinger, Weinheim Baden-Württemberg (DE)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 17/967,063

(22) Filed: Oct. 17, 2022

(65) Prior Publication Data

US 2024/0125620 A1  Apr. 18, 2024

(51) Int. Cl.
| | |
|---|---|
| G01C 21/00 | (2006.01) |
| G01C 21/32 | (2006.01) |
| G08G 5/51 | (2025.01) |
| G08G 5/56 | (2025.01) |
| G08G 5/72 | (2025.01) |
| G08G 5/76 | (2025.01) |

(52) U.S. Cl.
CPC ........... *G01C 21/387* (2020.08); *G01C 21/32* (2013.01); *G01C 21/3807* (2020.08); *G01C 21/3841* (2020.08); *G08G 5/51* (2025.01); *G08G 5/56* (2025.01); *G08G 5/727* (2025.01); *G08G 5/76* (2025.01)

(58) Field of Classification Search
CPC .. G01C 21/387; G01C 21/32; G01C 21/3807; G01C 21/3841; G01C 21/00; G08G 5/0043; G08G 5/0082; G08G 5/0091; G08G 5/065; G08G 5/0013; G08G 5/0021
USPC .......................................................... 701/450
See application file for complete search history.

(56) References Cited

U.S. PATENT DOCUMENTS

| | | | |
|---|---|---|---|
| 7,706,971 B2 | 4/2010 | Jaugilas et al. | |
| 2007/0021908 A1* | 1/2007 | Jaugilas | G09B 29/005 701/450 |
| 2014/0039783 A1* | 2/2014 | White | G08G 5/065 701/120 |

* cited by examiner

*Primary Examiner* — Shardul D Patel
(74) *Attorney, Agent, or Firm* — Joseph M. Butscher; The Small Patent Law Group LLC (57) ABSTRACT

A system and a method include a control unit configured to monitor one or more values of one or more aircraft at one or more airports, and compare the one or more values with one or more attributes of one or more airport maps associated with the one or more airports to determine accuracy of the one or more airport maps.

20 Claims, 3 Drawing Sheets

AIRPORT MAP VALIDATION SYSTEMS AND METHODS

FIELD OF THE DISCLOSURE

Examples of the present disclosure generally relate to systems and methods for validating the accuracy of airport maps.

BACKGROUND OF THE DISCLOSURE

Aircraft are used to transport passengers and cargo between various locations. Numerous aircraft depart from and arrive at a typical airport every day.

Each airport can be mapped. For example, an airport map includes the various locations of runways, gates, taxiways, parking stands, and the like for a particular airport. An airport mapping database includes geometries and various attributes for various areas and locations of an airport. Airport mapping databases are typically updated with information received from a government source, such as the United States Federal Aviation Administration (FAA), a Notice to Air Missions (NOTAM) notification publication, and/or satellite images.

However, it has been found that mapping information for certain airport mapping databases may not be entirely accurate. In particular, certain smaller airports may not provide airport mapping databases that include accurate, up-to-date information regarding the various features of the airports.

SUMMARY OF THE DISCLOSURE

A need exists for a system and a method for validating accuracy of maps of airports. Further, a need exists for a system and a method for providing accurate, up-to-date information regarding various features of an airport.

With those needs in mind, certain examples of the present disclosure provide a system including a control unit configured to monitor one or more values of one or more aircraft at one or more airports, and compare the one or more values with one or more attributes of one or more airport maps associated with the one or more airports to determine accuracy of the one or more airport maps.

In at least one example, the one or more aircraft include a plurality of aircraft. In at least one example, the one or more airports include a plurality of airports, and the one or more airport maps include a plurality of airport maps associated with the plurality of airports.

In at least one example, the one or more values include one or both of a position or a movement of the one or more aircraft. In at least one further example, the position or the movement of the one or more aircraft are determined through one or both of automatic dependent surveillance-broadcast (ADS-B) signals or global positioning system (GPS) signals.

In at least one example, the one or more attributes include locations of one or more runways, one or more taxiways, and one or more parking stands. In at least one example, the one or more attributes include restrictions regarding one or more locations of the airport.

The system can also include a tracking sub-system in communication with the control unit. The tracking sub-system is configured to track movement of the one or more aircraft at the one or more airports. In at least one example, the one or more values include the movement of the one or more aircraft at the one or more airports.

The system can also include a weather determination sub-system in communication with the control unit. The weather determination sub-system is configured to determine weather conditions at the one or more airports. At least one of the one or more attributes change based on the weather conditions.

In at least one example, the control unit is further configured to revise the one or more airport maps in response to determining one or more discrepancies of the one or more airport maps.

In at least one example, the control unit is further configured to control at least one aspect of the one or more aircraft at the one or more airports in response to determining that the one or more airport maps are accurate.

Certain examples of the present disclosure provide a method including monitoring, by a control unit, one or more values of one or more aircraft at one or more airports; comparing, by the control unit, the one or more values with one or more attributes of one or more airport maps associated with the one or more airports; and determining, by the control unit based on said comparing, accuracy of the one or more airport maps.

Certain examples of the present disclosure provide a non-transitory computer-readable storage medium comprising executable instructions that, in response to execution, cause one or more control units comprising a processor, to perform operations including monitoring one or more values of one or more aircraft at one or more airports; comparing the one or more values with one or more attributes of one or more airport maps associated with the one or more airports; and determining, based on said comparing, accuracy of the one or more airport maps.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide mapping validation systems and methods for maps of airports. The systems and methods analyzes aircraft position data to validate information and/or also derive new information in relation to an airport map.

Figure 1:
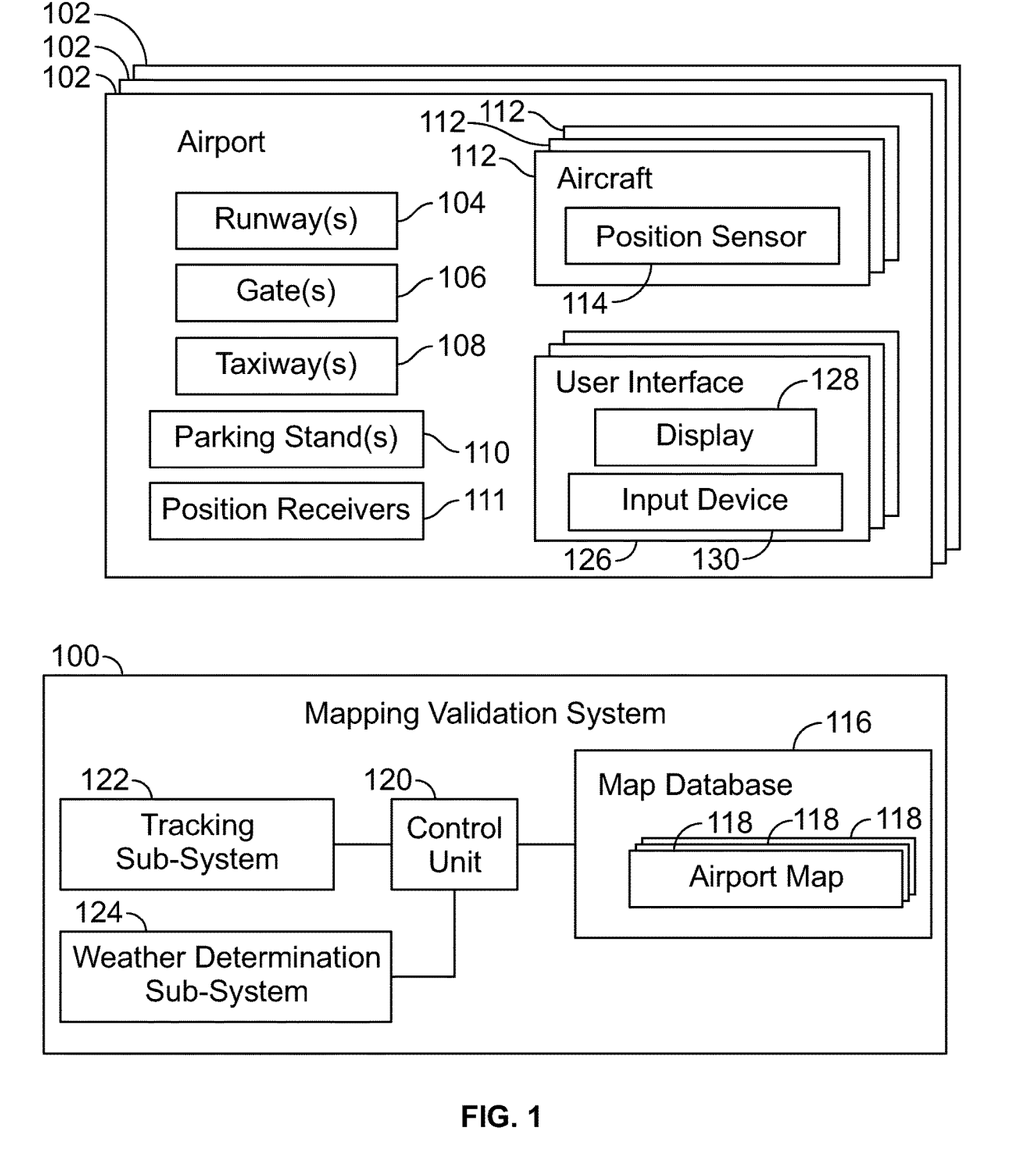
FIG. 1 illustrates a schematic block diagram of a mapping validation system configured to validate maps of airports, according to an example of the present disclosure.

FIG. 1 illustrates a schematic block diagram of a mapping validation system 100 configured to validate maps of airports 102, according to an example of the present disclosure. The mapping validation system 100 can be used in relation to numerous airports, such as the airports within a state, a region including one or more states, one or more countries, a hemisphere, or the entire world. In at least one example, the mapping validation system 100 can be used in relation to airports 102 throughout the world, such as all airports 102 within the world. In at least one example, the mapping validation system 100 can be used in relation to a subset of airports 102, whether in the world, a hemisphere, a region, a state, or the like. In at least one example, the mapping validation system 100 can be used in relation to a single airport 102.

Each airport 102 includes various features, including structures, areas, passageways, and the like. For example, each airport 102 includes one or more runways 104, one or more gates 106, one or more taxiways 108, one or more parking stands 110 (such as parking areas not at gates), and the like. In at least one other example, the airport 102 may not include one or more of runways, taxiways, gates, or parking stands. FIG. 1 merely shows certain examples of the features of the airports 102, such as the runways(s) 104, gate(s) 106, taxiway(s) 108, and parking stands(s) 110. It is to be understood that the airports 102 can include various other features, such as terminals, air traffic control towers, construction areas, deicing locations, etc., other than those shown.

Aircraft 112 depart from and arrive at the airports 102. The aircraft 112 travel in relation to the various features at the airports 102. For example, the aircraft 112 can be parked at gates 106 and/or parking stands 110, move along taxiways 108 and runways 104, and the like. The aircraft 112 include position sensors 114, as described herein.

The mapping validation system 100 includes a map database 116 that stores digital airport maps 118. Each airport map 118 is associated with a respective airport 102. An airport map 118 includes information regarding the various features of an associated airport 102, such as locations of the runway(s) 104, the gate(s) 106, the taxiway(s) 108, the parking stand(s) 110, and the like.

A control unit 120 is in communication with map database 116, such as through one or more wired or wireless locations. The control unit 120 and the map database 116 can be co-located, such as at an airport, a central monitoring center, or the like. Optionally, the control unit 120 and the map database 116 can be remotely located from one another, and in communication with one another through a private or public data network. As an example, the control unit 120 and the map database 116 can be in communication with one another through the Internet, a cloud-based network, and/or the like.

In at least one example, the control unit 120 is also in communication with a tracking sub-system 122, such as through one or more wired or wireless connections. The control unit 120 and the tracking sub-system 122 can be co-located, such as at an airport, a central monitoring center, or the like. Optionally, the control unit 120 and the tracking sub-system 122 can be remotely located from one another, and in communication with one another through a private or public data network. As an example, the control unit 120 and the tracking sub-system 122 can be in communication with one another through the Internet, a cloud-based network, and/or the like.

In at least one example, the control unit 120 is also in communication with a weather determination sub-system 124, such as through one or more wired or wireless connections. The control unit 120 and the weather determination sub-system 124 can be co-located, such as at an airport, a central monitoring center, or the like. Optionally, the control unit 120 and the weather determination sub-system 124 can be remotely located from one another, and in communication with one another through a private or public data network. As an example, the control unit 120 and the weather determination sub-system 124 can be in communication with one another through the Internet, a cloud-based network, and/or the like.

Positions of the aircraft 112 at the airports 102 are detected by one or more position receivers 111 that receive position signals output by the position sensors 114 of the aircraft 112. For example, the position receivers 111 are automatic dependent surveillance-broadcast (ADS-B) receivers that receive ADS-B signals output by the positions sensors 114 (for example, transponders reading position from a sensor and outputting a corresponding signal) of the aircraft 112. As another example, the position sensors 114 can be global positioning system sensors. The position sensors 114 output signals indicative of one or more of the position, altitude, heading, acceleration, velocity, and/or the like of the aircraft 112. The signal is received by the position receiver(s) 111, which is in communication with a tracking sub-system 122, which is in communication with the control unit 120. In this manner, the control unit 120 is configured to track positions of the aircraft 112 at the airports 102 via the position signals 114 output by the position sensors 114, detected by the position receivers 111, and tracked by the tracking sub-system 122.

The tracking sub-system 122 is configured to track a current position of the aircraft 112 at an airport 102. In at least one example, the tracking sub-system 122 is an ADS-B tracking sub-system. In such an example, the ADS-B tracking sub-system 122 determines a current position of an aircraft 112 via satellite navigation through a positional signal of the aircraft 112 output by the position sensor 114, which is received by the position receiver(s) 111. The position sensor 114 can be or include a transmitter that periodically outputs information about the aircraft 112, such as identification details, current position, current altitude, and current velocity. The tracking sub-system 122 receives the transmitted position signal from the position receiver(s) 111 to determine a current and real time position, heading, velocity, and the like of the aircraft 112. Alternatively, the tracking sub-system 122 can be a radar system, GPS system, and/or other such system that is configured to track the position of the aircraft 112. As another example, a device on an aircraft can record position data, and upload the position data after the flight, such as via the Internet.

A user interface 126 includes a display 128 and an input device 130, both of which can be in communication with the control unit 120, such as through one or more wired or wireless connections. The display 128 can be a monitor, screen, television, touchscreen, and/or the like. The input device 130 can include a keyboard, mouse, stylus, touchscreen interface (that is, the input device 130 can be integral with the display 128), and/or the like.

In at least one example, at least one of the aircraft 112 includes a user interface 126. For example, a user interface 126 can be in communication with and/or form a part of a flight computer of an aircraft 112. As another example, a user interface 126 can be part of a separate computer workstation aboard an aircraft 112. As another example, the user interface 126 can be a handheld device, such as a smart phone, tablet, or the like, within an aircraft 112. As another example, the user interface 126 can be located remotely from the aircraft 112, such as at an air traffic control location, a ground control location, a central monitoring center, and/or the like. A plurality of user interfaces 126 can be present, at the airports 102, within aircraft 112, at a central monitoring center remote from the airports 102, and/or the like.

The control unit 120 can be in communication with the user interface(s) 126 through one or more wired (if at the same location), or wireless connections. For example, the control unit 120 can include a communication device, such as one or more antennas, transceivers, and/or the like, which allow for wireless communication with the user interface(s) 126. As another example, the control unit 120 and the user interface(s) 126 can be in communication through an intermediate medium, such as through the Internet, a private communication network, and/or the like.

The weather determination sub-system 124 communicates the current weather at and proximate to the airport(s) 102 to the control unit 120. For example, the weather determination sub-system 124 can be a meteorological and weather service that is in communication with the control unit 120. In at least one other example, the weather determination sub-system 124 can be an independent weather determination and forecasting system and/or service. For example, the weather determination sub-system 124 can include one or more Doppler radar installations.

In operation, in order to validate the airport maps 118 stored in the database, the control unit 120 compares the airport maps 118 with position and/or movement data of the aircraft 112 at the airports 102. The control unit 120 receives the tracked positions of the aircraft 112 at the airport 102 via the tracking sub-system 122. The control unit 120 compares the tracked positions of the aircraft 112 at an airport 102 with the airport map 118 to determine the existence of any discrepancies. For example, the airport map 118 for a particular airport 118 includes locations of taxiways 108 and runways 104, which can also have speed limits associated therewith. If the control unit 120 determines movement of an aircraft 112 at a location that is not associated with a taxiway 108 or runway 104 in relation to the airport map 118, the control unit 120 determines a discrepancy with the airport map 118. In response, the control unit 120 then outputs a discrepancy signal to one or more user interfaces 126 indicating the discrepancy. The discrepancy can then be shown on the display 128, for example.

As an example, an airport map 118 for an airport 102 includes a location of a taxiway 108. The taxiway 108 has an associated speed limit. If the control unit 120 detects movement of an aircraft 112 at a location within the taxiway 108 that is within a predetermined speed threshold, the control unit 120 confirms the location of the taxiway 108 on the airport map 118. If, however, the control unit 120 detects that movement of the aircraft at the location within the taxiway 108 exceeds an upper speed threshold by a predetermined magnitude (such as more than 20%), the control unit 120 determines a discrepancy with the location of the taxiway 108 on the airport map 118, and outputs the discrepancy signal to the user interface(s) 126. If such instance occurs less than a predetermined number within a predetermined period of time (such as less than five times within a day), the control unit 120 can further determine that such instances are speed limit violations by the particular aircraft, and such violations can be reported via violation signals to the user interface(s) 126. If, however, such instances occur more than the predetermined number within the predetermined period time, the control unit 120 can determine that an error may be present in the airport map 118, and output a potential map error signal to the user interface 126. The potential map error can be shown on the display 128, and be indicative of a discrepancy with the airport map 118.

As another example, the control unit 120 can monitor movement of an aircraft 112 and determine that the movement is not along any taxiway 108, runway 104 or the like in relation to the airport map 118. For example, a comparison of the airport map 118 and the tracked movement of the aircraft 112 at the associated airport 102 reveals that the aircraft 112 is moving along a path that is not shown on the airport map 118. As such, the control unit 120 can output a potential map error signal to the user interface 126 indicating that the airport map 118 may include a discrepancy as to a location of a taxiway 108 and/or a runway 104.

As another example, the control unit 120 analyzes an airport map 118 and determines that a particular taxiway 108 represented on the airport map 118 has a particular wingspan limit. However, the control unit 120 also determines that aircraft 112 having wingspans that exceed the noted wingspan limit are and/or have moved over the particular taxiway 108. Accordingly, the control unit 120 can then output a potential map error signal to the user interface 126 indicating that the wingspan limit associated with the particular taxiway 108 may be in error.

The weather determination sub-system 124 is configured to determine weather conditions at the airport(s) 102. In at least one example, at least one attribute of an airport map 118 may change based on certain weather conditions. For example, the weather determination sub-system 124 may indicate a low visibility condition, such as fog. In certain low visibility conditions, airports 102 may utilize low visibility taxiways 108, runway 104, or the like, which are shown on the airport map 118. The control unit 120 monitors the position and movement of the aircraft 112 during such weather conditions to determine whether such low visibility paths are accurately represented on the airport map 118. If a low visibility path represented on the airport map 118 is traveled by an aircraft 112 during low visibility conditions, the control unit 120 confirms such location. If, however, a normal visibility path (for example, during clear weather conditions) is being traveled during periods of low visibility, the control unit 120 can output a potential map error signal to the user interface 126 indicating that the airport map 118 may include a discrepancy as to a location of a path.

As described herein, the control unit 120 compares locations of various features on one or more airport maps 118 of one or more associated airports 102 with positions and/or movements of one or more aircraft 112 at the one or more associated airports 102 to determine accuracy of the airport map(s) 118. In at least one example, if the positions and/or movements of the one or more aircraft 112 at the airport(s) 102 conform to the airport map(s) 118, the control unit 120 outputs a validation signal (validating accuracy of the airport map(s) 118) to one or more user interfaces 126. If, however, the positions and/or movement of the one or more aircraft 112 at the airport(s) 102 differ from one or more features represented on the aircraft map(s) 118, the control unit 120 outputs a potential map error signal(s) to the user interface 126 indicating that the airport map(s) 118 may include a discrepancy as to a location of one or more features. In this manner, the control unit 120 is configured to determine accuracy of the airport map(s) 118 based on tracked position(s) and/or movement(s) of the aircraft 112 at the airport(s) 102 associated with the airport map(s) 118.

Aircraft 112 operating at an airport 102 follow certain rules. For example, the aircraft 112 taxi only on paved surfaces, typically along taxi guidance lines. The aircraft 112 park only at parking stands 110. The taxi path an aircraft 112 follows matches an air traffic control clearance, which obeys local regulations (for example, one-way taxiways, not in closed areas, not in construction areas, and/or the like). Such information can be included within an airport map 118 for an airport 102. In at least one example, the control unit 120 compares taxiing operations of aircraft 112 at an airport 102 in relation to an airport map 118 of the airport 102 in order to determine an accuracy of the airport map 118.

In at least one example, the control unit 120 pre-filters received data and remove records not needed for any intended use. For example, the control unit 120 can be configured to analyze only ground based movement of commercial airplanes at an airport 102. As such, the control unit 120 can initially pre-filter certain data, such as by removing data related to: airborne aircraft (as such do not follow taxiways or runways, not even when in final approach/touch-down/climb-out), ground vehicles (for example, some airports equip ground vehicles with ADS-B transponders), helicopters (which can hover over un-paved surfaces, move sideways, etc.), and/or the like.

In at least one example, the control unit 120 pre-processes certain data. For example, tracked position data of the aircraft 112 can include characteristics that are to be corrected for desired results. For example, the ADS-B protocol typically requires transmission of a true bearing of an aircraft. However, some aircraft transmit a magnetic bearing instead. A suitable pre-processing correction includes identification of affected aircraft. For example, the control unit 120 can compute a geometric direction between subsequent position reports and compare such value against a transmitted track, both of which should be similar. If the computed value and the magnetic deviation is similar to the transmitted track, then the aircraft apparently sends magnetic bearing. Additionally, or optionally, the control unit 120 can be in communication with a database of such aircraft transmitting magnetic instead of true bearing. The control unit 120 can also be configured to exclude erroneous global positioning system (GPS) tracks of aircraft.

In at least one example, the control unit 120 is configured to determine a discrepancy within an airport map 118 if a particular value of the airport map 118 is outside of a derived value +/- a predetermined uncertainty envelope. For example, an aircraft taxing exactly North at 10 knots (5 m/s) travels about 25 m between 2 position reports of ADS-B signals (such as within 5 seconds). The ADS-B protocol may have only a spatial resolution of 1.1 m, and therefore it is possible that one point is shifted 55 cm to one side, and the other 55 cm to the other side, which would result in a derived geometric bearing of 360±2.6 degrees. The control unit 120 can correct such uncertainties.

In at least one example, the control unit 120 is configured to analyze and/or compile statistically significant and reliable data. In this manner, the control unit 120 can be configured to collect test results of the same type (and related to the same database elements) over a predetermined period of time, such as one day, one week, one month, a year, or the like. In order to avoid false alerts, the control unit 120 may output an alert (regarding a discrepancy with an airport map) when certain predetermined thresholds are exceeded. For example, movement of an aircraft 112 at a speed that exceeds a speed limit with respect to an area on an airport map 118 may be reported by the control unit 120 as a possible discrepancy if such occurs more than five times within an hour, twenty times per day, and/or the like.

As described herein, the control unit 120 monitors particular values (such as positions and/or movements) of aircraft 112 at an airport 102 and compares such values with attributes of an airport map 118 associated with the airport 102 to determine an accuracy of the airport map 118. The following table shows examples of values of the aircraft 112 in relation to attributes of an airport map 118 associated with the airport 102.

| Value(s) of aircraft | Attribute(s) of airport map |
|---|---|
| Aircraft speed | Taxiway maximum speed |
| Location and type of aircraft | Runway/taxiway/apron/stand aircraft type restriction(s) |
| Aircraft classification number and flight phase | Runway/taxiway/apron/stand pavement classification number |
| Aircraft type | Parking stand location aircraft type allowances/restrictions |
| GPS elevation | Airport elevations, for example, runway elevation profile (centerline points), runway threshold elevation and slope, runway touchdown zone elevation and slope, stand elevation |
| Movement of aircraft | Runway, taxiway, stand status (for example, closed) |
| Movement of aircraft | Runway exit |
| Movement of aircraft | Intermediate takeoff positions |
| Location | Construction area |

The table shown above includes examples of values and attributes. Various other values and attributes can also be used. That is, the table is not limiting.

In at least one example, an airport map 118 stored in the map database 116 includes a maximum taxi speed permitted on taxiways. The control unit 120 can determine the speed of taxiing aircraft based on position data of the aircraft, such as from ADS-B data and/or a first derivative of traveled distance (distance between position reports). If aircraft regularly exceed the designated speed limit by a predetermined limit (for example, more than 5%), the control unit 120 can determine that the designated value for the airport map is incorrect.

In at least one example, an airport map 118 includes aircraft types not allowed on various movement area types. If aircraft regularly operate in areas, which are supposedly not allowed for this aircraft type, the control unit 120 can determine that the designated value is incorrect.

In at least one example, an airport map 118 incudes pavement classification numbers (PCN) for various movement area types. The control unit 120 can determine the aircraft classification number (ACN) of a taxiing aircraft in relation to the type of aircraft. If aircraft regularly operate in areas with PCN that is less than ACN, the control unit 120 may determine that the designated value is incorrect.

In at least one example, an airport map 118 includes a designated wingspan limit for taxiways. If aircraft with wingspans larger than the designated limit regularly operate on taxiways or aircraft stands, the control unit 120 may determine that the designated value is incorrect.

In at least one example, an airport map 118 includes aircraft types allowed on parking stands. If aircraft are parked on aircraft stands that are not designated for this type, then the control unit 120 determines that the list should be amended.

In at least one example, a GPS track provides not only latitude and longitude information, but also an elevation value. Airports typically provide elevation values for thresholds, but often not for other points on the runway. As such, the control unit 120 can use the GPS elevation to validate the stored elevation values of a runway. The control unit 120 can also use the GPS data to derive a complete vertical profile of the runway, and specifically to validate slopes in touch-down zones, and along the complete runway. The control unit 120 can also analyze elevations of additional points, such as additional runway centerline points, profiles of a complete taxi routing network, and/or the like.

In at least one example, an airport map 118 also includes different types of status, such as open/closed status for runways, taxiways, and stands. If a movement area is supposedly closed, but an aircraft taxies there, the control unit 120 determines that status is incorrect. Conversely, if aircraft do not use a supposedly open area for a predetermined time period (such as one week), the control unit 120 may output a discrepancy signal indicating that the area should be checked, closed, or restricted.

In at least one example, an airport map 118 includes directionality of a taxiway (for example, one-way). If the control unit 120 determines that aircraft regularly operate (such as 5 or more times in a day) in an opposite other direction, the control unit 120 determines that the designated value is incorrect. As another example, the control unit 120 can determine longitudinal deviations in relation to one or more designated points or guide lines of a particular path (such as a runway or taxiway), and determine whether a designated value is correct or incorrect based on a threshold longitudinal deviation.

As described herein, the system 100 includes the control unit 120, which is configured to monitor one or more values of one or more aircraft 112 at one or more airports 102, and compare the one or more values with one or more attributes of one or more airport maps 118 associated with the one or more airports 102 to determine accuracy of the one or more airport maps 118. In at least one example, the one or more aircraft 112 include a plurality of aircraft 112. In at least one example, the one or more airports 102 include a plurality of airports 102, and the one or more airport maps 118 include a plurality of airport maps 118 associated with the plurality of airports 102 (such that each airport map 118 is associated with a particular airport 102). In at least one example, the one or more values include one or both of a position or a movement of the one or more aircraft 112. In at least one example, the one or more attributes include locations of one or more runways 104, one or more taxiways 108, and one or more parking stands 110. In at least one example, the one or more attributes include restrictions regarding one or more locations of the airport.

Figure 2:
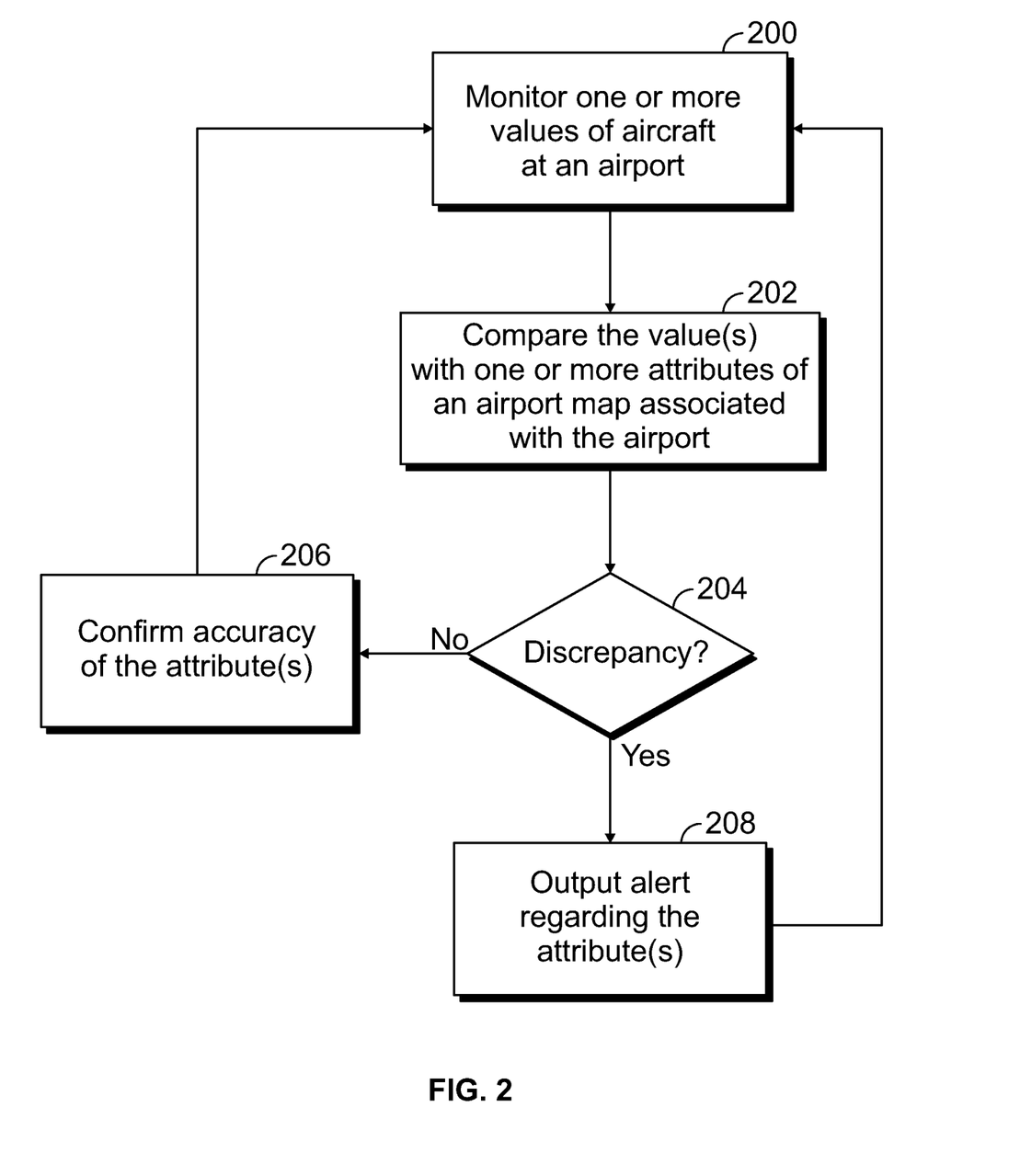
FIG. 2 illustrates a flow chart of a mapping validation method, according to an example of the present disclosure.

FIG. 2 illustrates a flow chart of a mapping validation method, according to an example of the present disclosure. Referring to FIGS. 1 and 2, at 200, the control unit 120 monitors on or more values of aircraft 112 at an airport 102. In at least one example, the values include one or both of position and/or movement of the aircraft 112, such as tracked by the tracking sub-system 122.

At 202, the control unit 120 compares the value(s) with one or more attributes of an airport map 118 associated with the airport 102. The attributes include or more of locations of various paths and areas (such as taxiways, runways, parking stands, gates, etc.), restrictions regarding such locations (such as speed limits, aircraft type usage, wingspan limits, one way travel, etc.), permitted times of use of such locations, restricted times of use of such locations, and/or the like. At 204, the control unit 120 determines if there is a discrepancy between the one or more values of the aircraft 112 at the airport and the one or more attributes of the airport map 118 associated with the airport 102. If no discrepancy exists, the method proceeds from 204 to 206, at which the control unit confirms the accuracy of the attribute(s) of the airport map 118 (and may output a corresponding signal to a user interface 126), and then method returns to 200. If, however, a discrepancy at 204 is present, the method proceeds to 208, at which the control unit 120 outputs an alert (such as a discrepancy signal and/or a potential map error signal) regarding the attribute(s), such as to a user interface 126.

In at least one example, in response to determining a discrepancy, the control unit 120 can revise the airport map 118 to indicate the existence of the discrepancy. That is, the control unit 120 can automatically annotate the airport map 118 to show the discrepancy. In at least one other example, the control unit 120 can automatically revise the airport map 118 based on the discrepancy (such as by deleting or adding a portion thereto).

In at least one example, in response to confirming the accuracy of an airport map 118 and/or detecting one or more detected discrepancies within the airport map 118, the control unit 120 can automatically control one or more aircraft 112 at the airport based thereon. For example, the control unit 120 can take control of an aircraft to ensure that the aircraft 112 does not exceed a particular speed limit, move into a restricted area, and/or the like. Thus, in at least one example, the control unit 120 can be further configured to control at least one aspect (such as a ground speed) of the one or more aircraft 112 at the one or more airports 102 in response to determining that the airport maps 118 are accurate.

Figure 3:
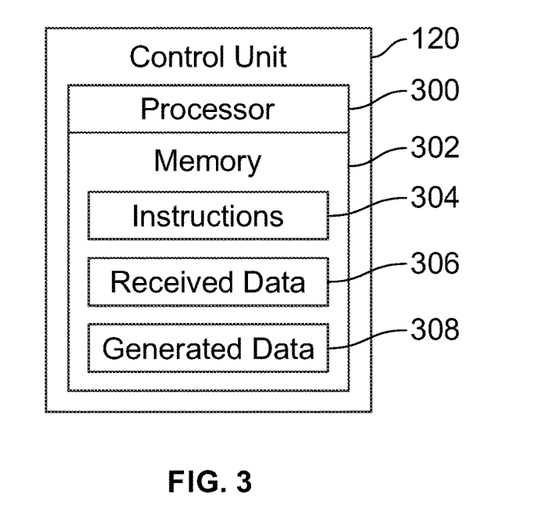
FIG. 3 illustrates a schematic block diagram of the control unit, according to an example of the present disclosure.

FIG. 3 illustrates a schematic block diagram of the control unit 120, according to an example of the present disclosure. In at least one example, the control unit 120 includes at least one processor 300 in communication with a memory 302. The memory 302 stores instructions 304, received data 306, and generated data 308. The control unit 120 shown in FIG. 3 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-3, examples of the subject disclosure provide systems and methods that allow large amounts of data to be quickly and efficiently analyzed by a computing device. For example, the control unit 120 can analyze position data of numerous aircraft 112 at numerous airports 102 in relation to numerous airport maps 118 associated with the airports 102 in real time. As such, large amounts of data, which may not be discernable by human beings, are being tracked and analyzed. The vast amounts of data are efficiently organized and/or analyzed by the control unit 120, as described herein. The control unit 120 analyzes the data in a relatively short time in order to quickly and efficiently determine whether or not the airport maps 118 include any discrepancies. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the mapping validation system 100, such as the control unit 120, provide and/or enable a computer system to operate as a special computer system for determining accuracy of the airport map(s) 118. The control unit 120 improves upon standard computing devices by assessing map accuracy in an efficient and effective manner.

In at least one example, all or part of the systems and methods described herein may be or otherwise include an artificial intelligence (AI) or machine-learning system that can automatically perform the operations of the methods also described herein. For example, the control unit 120 can be an artificial intelligence or machine learning system. These types of systems may be trained from outside information and/or self-trained to repeatedly improve the accuracy with how data is analyzed to determine the accuracy of the airport maps based on the values of aircraft at the airports. Over time, these systems can improve by determining map accuracy and/or discrepancies with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the assessment of the airport maps. The training minimizes conflicts and interference by performing an iterative training algorithm, in which the systems are retrained with an updated set of data (for example, data received in real time from numerous aircraft) and based on the feedback examined prior to the most recent training of the systems. This provides a robust analysis model that can better assess the airport maps.

Figure 4:
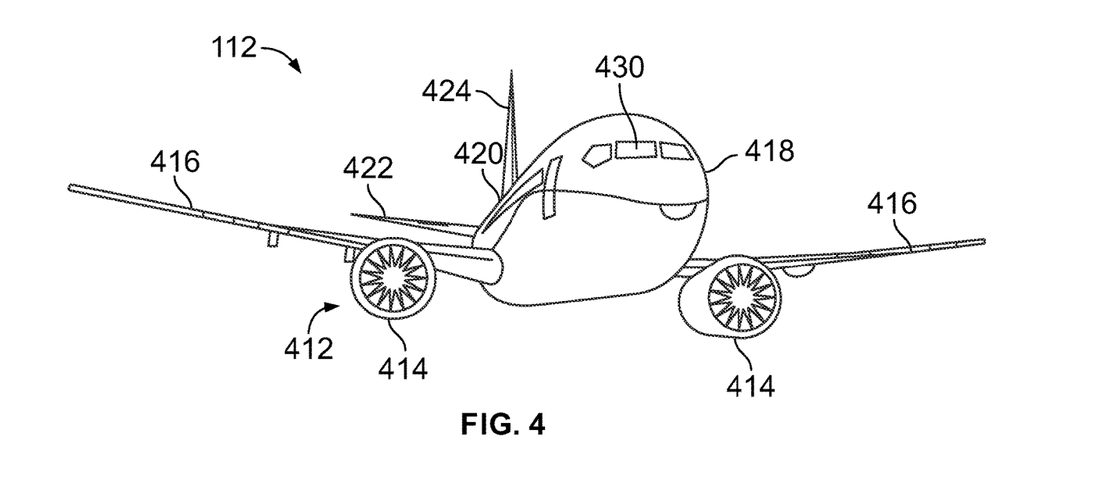
FIG. 4 illustrates a perspective front view of an aircraft, according to an example of the present disclosure.

FIG. 4 illustrates a perspective front view of an aircraft 112, according to an example of the present disclosure. The aircraft 112 includes a propulsion system 412 that includes engines 414, for example. Optionally, the propulsion system 412 may include more engines 414 than shown. The engines 414 are carried by wings 416 of the aircraft 112. In other examples, the engines 414 may be carried by a fuselage 418 and/or an empennage 420. The empennage 420 may also support horizontal stabilizers 422 and a vertical stabilizer 424. The fuselage 418 of the aircraft 112 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 112. It is to be understood that the aircraft 112 can be sized, shaped, and configured differently than shown in FIG. 4.

Further, the disclosure comprises examples according to the following clauses:

Clause 1. A system comprising:
a control unit configured to:
monitor one or more values of one or more aircraft at one or more airports, and
compare the one or more values with one or more attributes of one or more airport maps associated with the one or more airports to determine accuracy of the one or more airport maps.

Clause 2. The system of Clause 1, wherein the one or more aircraft comprise a plurality of aircraft.

Clause 3. The system of Clauses 1 or 2, wherein the one or more airports comprise a plurality of airports, and wherein the one or more airport maps comprise a plurality of airport maps associated with the plurality of airports.

Clause 4. The system of any of Clauses 1-3, wherein the one or more values comprise one or both of a position or a movement of the one or more aircraft.

Clause 5. The system of Clause 4, wherein the position or the movement of the one or more aircraft are determined through one or both of automatic dependent surveillance-broadcast (ADS-B) signals or global positioning system (GPS) signals.

Clause 6. The system of any of Clauses 1-5, wherein the one or more attributes comprise locations of one or more runways, one or more taxiways, and one or more parking stands.

Clause 7. The system of any of Clauses 1-6, wherein the one or more attributes comprise restrictions regarding one or more locations of the airport.

Clause 8. The system of any of Clauses 1-7, further comprising a tracking sub-system in communication with the control unit, wherein the tracking sub-system is configured to track movement of the one or more aircraft at the one or more airports, and wherein the one or more values comprise the movement of the one or more aircraft at the one or more airports.

Clause 9. The system of any of Clauses 1-8, further comprising a weather determination sub-system in communication with the control unit, wherein the weather determination sub-system is configured to determine weather conditions at the one or more airports, and wherein at least one of the one or more attributes change based on the weather conditions.

Clause 10. The system of any of Clauses 1-9, wherein the control unit is further configured to revise the one or more airport maps in response to determining one or more discrepancies of the one or more airport maps.

Clause 11. The system of any of Clauses 1-10, wherein the control unit is further configured to control at least one aspect of the one or more aircraft at the one or more airports in response to determining that the one or more airport maps are accurate.

Clause 12. A method comprising:
monitoring, by a control unit, one or more values of one or more aircraft at one or more airports;
comparing, by the control unit, the one or more values with one or more attributes of one or more airport maps associated with the one or more airports; and
determining, by the control unit based on said comparing, accuracy of the one or more airport maps.

Clause 13. The method of Clause 12, wherein the one or more aircraft comprise a plurality of aircraft, wherein the one or more airports comprise a plurality of airports, and wherein the one or more airport maps comprise a plurality of airport maps associated with the plurality of airports.

Clause 14. The method of Clauses 12 or 13, wherein the one or more values comprise one or both of a position or a movement of the one or more aircraft.

Clause 15. The method of Clause 14, wherein the position or the movement of the one or more aircraft are determined through one or both of automatic dependent surveillance-broadcast (ADS-B) signals or global positioning system (GPS) signals.

Clause 16. The method of any of Clauses 12-14, wherein the one or more attributes comprise:
locations of one or more runways, one or more taxiways, and one or more parking stands, and
restrictions regarding one or more locations of the airport.

Clause 17. The method of any of Clauses 12-16, further comprising tracking, by a tracking sub-system in communication with the control unit, movement of the one or more aircraft at the one or more airports, and wherein the one or more values comprise the movement of the one or more aircraft at the one or more airports.

Clause 18. The method of any of Clauses 12-17, further comprising determining, by a weather determination sub-system in communication with the control unit, weather conditions at the one or more airports, and wherein at least one of the one or more attributes change based on the weather conditions.

Clause 19. The method of any of Clauses 12-18, further comprising revising, by the control unit, the one or more airport maps in response to said determining including determining one or more discrepancies of the one or more airport maps.

Clause 20. A non-transitory computer-readable storage medium comprising executable instructions that, in response to execution, cause one or more control units comprising a processor, to perform operations comprising:
monitoring one or more values of one or more aircraft at one or more airports;
comparing the one or more values with one or more attributes of one or more airport maps associated with the one or more airports; and
determining, based on said comparing, accuracy of the one or more airport maps.

As described herein, examples of the present disclosure provide systems and methods for validating maps of airports. Further, examples of the present disclosure provide systems and methods for providing accurate, up-to-date information regarding various features of an airport.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35

U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
one or more position receivers configured to detect one or more position signals output by one or more aircraft at one or more airports;
a tracking sub-system in communication with the one or more position receivers, wherein the tracking sub-system is configured tracking the one or more aircraft at the one or more airports based on the one or more position signals detected by the one or more position receivers;
a weather determination sub-system configured to determine weather conditions at the one or more airports,
a control unit including one or more processors, wherein the control unit is in communication with the tracking sub-system and the weather determination sub-system, the control unit configured to:
monitor movement of the one or more aircraft at the one or more airports,
monitor the weather conditions at the one or more airports, and
compare the movement of the one or more aircraft at the one or more airports and the weather conditions at the one or more airports with one or more attributes of one or more airport maps associated with the one or more airports to determine accuracy of the one or more airport maps.

2. The system of claim 1, wherein the one or more aircraft comprise a plurality of aircraft.

3. The system of claim 1, wherein the one or more airports comprise a plurality of airports, and wherein the one or more airport maps comprise a plurality of airport maps associated with the plurality of airports.

4. The system of claim 1, wherein the one or more position signals include one or both of automatic dependent surveillance-broadcast (ADS-B) signals or global positioning system (GPS) signals.

5. The system of claim 1, wherein the one or more attributes comprise locations of one or more runways, one or more taxiways, and one or more parking stands.

6. The system of claim 1, wherein the one or more attributes comprise restrictions regarding one or more locations of the airport.

7. The system of claim 1, wherein at least one of the one or more attributes change based on the weather conditions.

8. The system of claim 1, wherein the control unit is further configured to revise the one or more airport maps in response to determining one or more discrepancies of the one or more airport maps.

9. The system of claim 1, wherein the control unit is further configured to automatically control at least one aspect of movement of the one or more aircraft at the one or more airports in response to determining that the one or more airport maps are accurate.

10. The system of claim 1, wherein the one or more attributes comprise pavement classification numbers for various movement area types.

11. The system of claim 1, wherein the one or more attributes comprise a wingspan limit.

12. A method comprising:
detecting, by one or more position receivers, one or more position signals output by one or more aircraft at one or more airports;
tracking, by a tracking sub-system in communication with the one or more position receivers, the one or more aircraft at the one or more airports based on the one or more position signals detected by the by the one or more position receivers;
determining, by a weather determination sub-system, weather conditions at the one or more airports;
monitoring, by a control unit including one or more processors in communication with the tracking sub-system, movement of the one or more aircraft at the one or more airports;
monitoring, by the control unit in communication with the weather sub-system, the weather conditions at the one or more airports;
comparing, by the control unit, the movement of the one or more aircraft at the one or more airports and the weather conditions at the one or more airports with one or more attributes of one or more airport maps associated with the one or more airports; and
determining, by the control unit based on said comparing, accuracy of the one or more airport maps.

13. The method of claim 12, wherein the one or more attributes comprise a wingspan limit.

14. The method of claim 12, wherein the one or more aircraft comprise a plurality of aircraft, wherein the one or more airports comprise a plurality of airports, and wherein the one or more airport maps comprise a plurality of airport maps associated with the plurality of airports.

15. The method of claim 12, wherein the one or more position signals include one or both of automatic dependent surveillance-broadcast (ADS-B) signals or global positioning system (GPS) signals.

16. The method of claim 12, wherein the one or more attributes comprise:
locations of one or more runways, one or more taxiways, and one or more parking stands, and
restrictions regarding one or more locations of the airport.

17. The method of claim 12, wherein at least one of the one or more attributes change based on the weather conditions.

18. The method of claim 12, further comprising revising, by the control unit, the one or more airport maps in response to said determining including determining one or more discrepancies of the one or more airport maps.

19. The method of claim 12, wherein the one or more attributes comprise pavement classification numbers for various movement area types.

20. A system comprising:
one or more position receivers configured to detect one or more position signals output by one or more aircraft at one or more airports;
a tracking sub-system in communication with the one or more position receivers, wherein the tracking sub-system is configured tracking the one or more aircraft at the one or more airports based on the one or more position signals detected by the one or more position receivers;

a weather determination sub-system configured to determine weather conditions at the one or more airports, a control unit including one or more processors, wherein the control unit is in communication with the tracking sub-system and the weather determination sub-system, the control unit configured to:

monitor movement of the one or more aircraft at the one or more airports, monitor the weather conditions at the one or more airports, determine wingspan of the one or more aircraft at the one or more airports, determine one or more aircraft classification numbers for the one or more aircraft at the one or more airports, compare (a) the movement of the one or more aircraft at the one or more airports, (b) the weather conditions at the one or more airports, (c) the wingspan of the one or more aircraft at the one or more airports, and (d) the aircraft classification numbers with one or more attributes of one or more airport maps associated with the one or more airports to determine accuracy of the one or more airport maps, and revise the one or more airport maps in response to determining one or more discrepancies of the one or more airport maps.

* * * * *